United States Patent [19]
Leone et al.

[11] 3,750,018
[45] July 31, 1973

[54] UNGATED FET METHOD FOR MEASURING INTEGRATED CIRCUIT PASSIVATION FILM CHARGE DENSITY

[75] Inventors: Louis William Leone; Theodore Adam Morange; Donald Francis Reilly; Paul James Schram, all of Wappingers Falls, N.Y.

[73] Assignee: International Business Machines Corporation, Armonk, N.Y.

[22] Filed: Nov. 24, 1971

[21] Appl. No.: 201,677

[52] U.S. Cl. .............................. 324/158 T, 324/54
[51] Int. Cl. ....................... G01r 31/26, G01r 31/12
[58] Field of Search ................... 324/158 T, 158 D, 324/54; 29/574

[56] References Cited
UNITED STATES PATENTS
3,648,170   3/1972   Embree et al. ................... 324/158 T

OTHER PUBLICATIONS
Battista, M. A.; "Test Vehicle..."; IBM Tech. Dis. Bull.; V. 13; No. 6; Nov. 1970; pg. 1433-34

*Primary Examiner*—Rudolph V. Rolinec
*Assistant Examiner*—Ernest F. Karlsen
*Attorney*—Robert J. Haase et al.

[57] ABSTRACT

An ungated FET having an annular drain surrounding a central source is formed on a test site on the same semiconductor chip with product FET devices. All FETs are covered with a passivating film whose charge level is to be determined. An off-chip operational amplifier circuit is connected to the ungated FET to provide automatically whatever source-to-substrate bias is required to cause a negligibly small source-to-drain current, e.g., 0.5 microamps to flow. The potential difference between the source and substrate is measured while the aforesaid negligibly small source-to-drain current is flowing. The charge level in the passivating material covering the product FET devices as well as the ungated FET device is calculated using the measured source-to-substrate bias.

4 Claims, 2 Drawing Figures

3,750,018

INVENTORS
LOUIS W. LEONE
THEODORE A. MORANGE
DONALD F. REILLY
PAUL J. SCHRAM

BY *Robert J. Haase*

ATTORNEY

UNGATED FET METHOD FOR MEASURING INTEGRATED CIRCUIT PASSIVATION FILM CHARGE DENSITY

BACKGROUND OF THE INVENTION

Metal-oxide-silicon field effect transistor leakage currents are very sensitive to the charge densities within the usual quartz and thermal oxide passivation layers because of the low substrate doping levels employed ($6 \times 10^{15}$ atoms per cubic centimeter). Accordingly, many attempts have been made in the prior art to measure FET passivation layer charge densities, for example by using MOS capacitors or by measuring the conduction between a pair of similar diffusions made at test sites on the same microcircuit chip with the FET devices to be tested. Such MOS capacitor measurements and the measurement of conduction between diffusions suffer the handicaps either of being slow or of requiring a number of theoretical assumptions in order to obtain the ultimately desired data, i.e., passivation layer charge densities, from the measured data. Thus, there is a need for a passivation layer charge density measuring technique which is both fast and simple.

SUMMARY OF THE INVENTION

The charge density in the passivation layer (such as quartz or thermal oxide) used on product MOSFET devices is obtained with the aid of an ungated FET which is formed at a test site on the same monolithic semiconductor chip with the product FET devices. The ungated FET preferably is equipped with an annular drain diffusion which completely encircles a central source diffusion. This arrangement substantially eliminates measurement complications due to source-to-substrate contact leakage in the test site device.

It can be shown that the effective charge density $N_{ss}$ in the passivation layer covering the region between diffusions in an annular type ungated FET (gate left unconnected) is defined by the expression $$N_{ss} = [2 \epsilon s (V_{sx\ off} + 2\phi_F) N/q]^{1/2}$$

where $\epsilon_s$ = permittivity of substrate material
$\phi_F$ = Fermi potential of substrate
$q$ = electron charge
$N$ = substrate doping concentration
$V_{sx\ off}$ = the voltage between the source and the substrate of the annular FET device which is required to produce negligible source to drain current.

It is assumed in the above expression that there is no depletion or accumulation of the substrate dopant at the silicon-passivation layer interface and that there is no work function difference between the surface of the passivation material and the silicon substrate.

Any conduction channel which forms in the annular FET in the presence of a source-to-drain potential is a function of the charge level in the passivation layer material over the semiconductor substrate and also a function of the source-to-substrate potential applied to the ungated annular FET. Said charge level is calculated from the foregoing expression by measuring the source-to-substrate bias required to reduce the source-to-drain current to a negligible value. No assumptions need to be made with respect to channel mobility and inversion layer geometry as in prior art conductance measuring techniques.

DESCRIPTION OF THE PREFERRED EMBODIMENT

Figure 1:
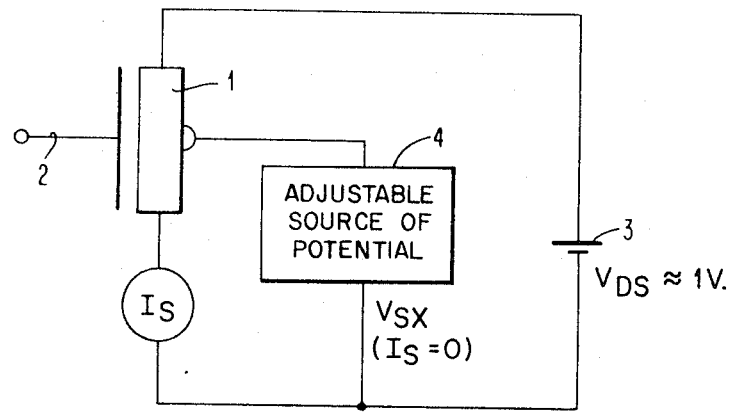
FIG. 1 is a simplified schematic diagram representing the equivalent electrical circuit employed in the determination of passivating layer oxide charge in accordance with the present invention.

Referring to FIG. 1, the reference numeral 1 represents a metal-oxide-silicon field effect transistor which is formed on the same monolithic chip with product FET devices and covered by the same passivating layer containing charges, the effective charge density of which is to be measured. The structure of the product FET devices including the passivating layer thereon (which may be, for example, quartz or thermally grown oxide) is conventional and for that reason is not shown in the drawing. It is preferred, however, that FET 1 be formed by a central source diffusion completely surrounded by an annular drain diffusion at a test site on the aforementioned chip and covered by the same passivating layer which covers the product FET devices. The gate electrode 2 of FET 1 is left unconnected in the test procedure of the present invention. A source potential 3 is connected between the source and drain of FET 1 and applies a potential of convenient amplitude, for example, approximately 1 volt. An adjustable source of potential 4 is connected between the substrate and source of FET 1 and is adjusted until the source-to-drain current $I_s$ flowing through FET 1 is reduced to a negligible value. Theoretically, the charge density in the passivating material covering FET 1 is precisely determined when the source-to-drain current is reduced to zero. In practice, however, the substrate voltage is adjusted to give negligibly small source-to-drain current in order to assure a stable measurement procedure requiring a relatively short settling time.

It can be shown that with no depletion or accumulation of substrate dopant at the silicon-passivating material interface and with no work function difference between the passivation film surface and the semiconductor substrate, charge density $N_{ss}$ is defined by the expression:

$$N_{ss} = [2 \epsilon s (V_{sx\ off} + 2\phi_F) N/q]^{1/2}$$

where $\epsilon_s$ = permittivity of substrate material
$\phi_F$ = Fermi potential of substrate
$q$ = Electron charge
$N$ = substrate doping concentration
$V_{sx\ off}$ = the magnitude of the source to substrate potential which is required to reduce the source to drain current in FET 1 to a negligible amount.

Figure 2:
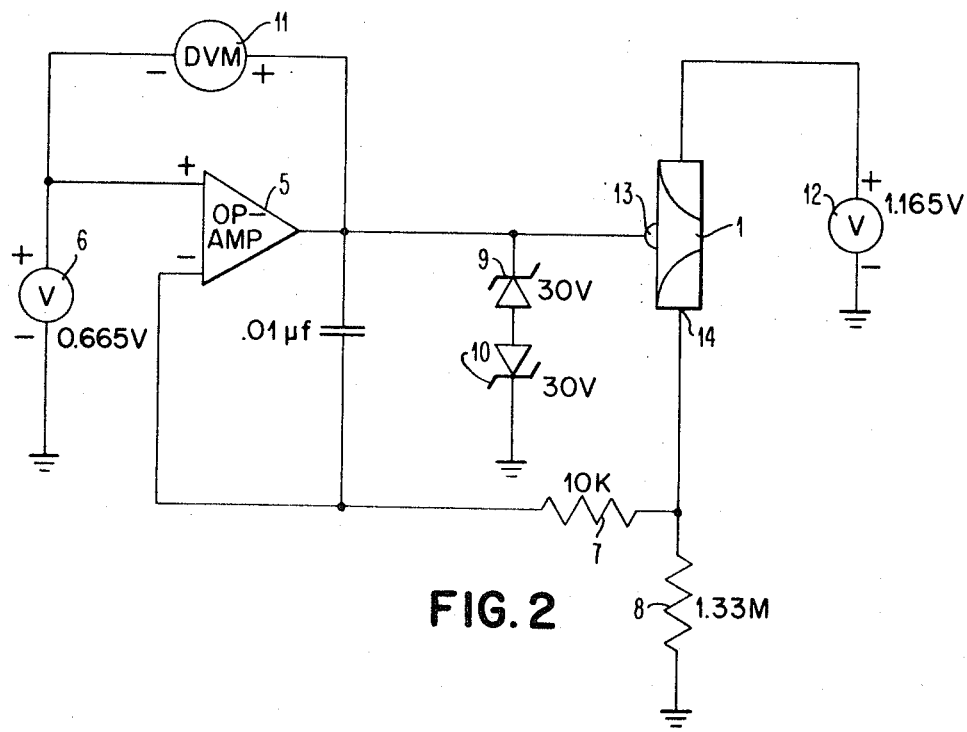
FIG. 2 is a simplified schematic diagram of a circuit arranged for the automatic application of the correct amount of substrate-to-source potential required in the technique of FIG. 1.

A circuit which automatically adjusts the source to substrate potential of FET 1 to reduce the source to drain current to a negligible value is represented by the simplified schematic diagram of FIG. 2. In FIG. 2, operational amplifier 5 receives a first input potential from voltage source 6 and a second input potential via feedback resistor 7 through which is applied the potential across resistor 8. The current through resistor 8 is the source-to-drain current flowing through FET 1. Zener diodes 9 and 10 are provided to limit the substrate voltage range to a reasonable and safe value. The potential across operational amplifier 5 as measured by volt meter 11 is equal to the substrate-to-source potential of FET 1 when the potential across resistor 8 is made equal to that of source 6 by the feedback action. In typical operational amplifier feedback fashion, amplifier 5 provides whatever output potential is necessary which, when applied between the respective substrate and source electrodes 13 and 14 of FET 1, causes the feedback potential developed across resistor 8 (coupled back through resistor 7) to substantially equal the potential of the input voltage from source 6. Voltage source 6 and resistor 8 are given values such that a finite but negligible current, for example, 0.5 microamperes, flows through the source and drain electrodes of FET 1 to stabilize and speed up the measurement procedure. In a representative case, the voltage of source 6 is 0.665 volts and the resistance of resistor 8 is $1.33 \times 10^6$ ohms. A convenient value of source-to-drain potential is provided by source 12, for example, 1.165 volts. The substrate-to-source voltage $V_{sx\ off}$ is indicated by volt meter 11 and the value thereof is inserted into the aforementioned expression for $N_{ss}$.

The determination of the source-to-substrate voltage which provides substantially a zero source-to-drain current eliminates the need for assumptions with respect to the channel mobility and inversion layer geometry in the test FET device 1. The use of the annular drain configuration completely encircling the central source diffusion substantially eliminates measurement problems attributable to source-to-substrate contact leakage in the test FET device 1.

While this invention has been particularly described with reference to the preferred embodiments thereof, it will be understood by those skilled in the art that the foregoing and other changes in form and details may be made therein without departing from the spirit and scope of the invention.

What is claimed is:

1. A method for determining the charge density within an insulating layer on a semiconductor substrate comprising providing an ungated field effect transistor formed on said substrate and having said insulating layer as its gate insulating layer, applying a fixed voltage between the source and drain electrodes of said transistor, applying a variable voltage between said substrate and said source, monitoring the magnitude of source-to-drain current flowing in said transistor, adjusting said variable voltage to a value at which said source-to-drain current is reduced to a negligible value, and determining said charge density using said value of said variable voltage.

2. The method defined in claim 1 and further including forming the drain and source junctions of said ungated field effect transistor by placing an annular drain junction in said substrate surrounding a central source junction.

3. The method defined in claim 1 wherein
   said substrate is silicon and
   said insulating layer is silicon oxide.

4. The method defined in claim 3 wherein
   said insulating layer is selected from the group consisting of quartz and thermally grown silicon oxide.

* * * * *